(12) United States Patent
Edwards et al.

(10) Patent No.: US 10,916,241 B1
(45) Date of Patent: Feb. 9, 2021

(54) THEME DETECTION FOR OBJECT-RECOGNITION-BASED NOTIFICATIONS

(71) Applicant: Capital One Services, LLC, McLean, VA (US)

(72) Inventors: Joshua Edwards, McLean, VA (US); Michael Mossoba, McLean, VA (US); Abdelkader Benkreira, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/729,745

(22) Filed: Dec. 30, 2019

(51) Int. Cl.
| | | |
|---|---|---|
| *G10L 21/00* | (2013.01) | |
| *G10L 25/00* | (2013.01) | |
| *G10L 15/18* | (2013.01) | |
| *G10L 15/22* | (2006.01) | |
| *G06T 19/00* | (2011.01) | |
| *H04W 4/021* | (2018.01) | |
| *G10L 25/03* | (2013.01) | |

(52) U.S. Cl.
CPC ........ *G10L 15/1815* (2013.01); *G06T 19/006* (2013.01); *G10L 15/22* (2013.01); *G10L 25/03* (2013.01); *H04W 4/021* (2013.01); *G10L 2015/228* (2013.01)

(58) Field of Classification Search
CPC ... G06T 19/006; G06T 19/003; G06T 3/0037; G06F 3/011; G06F 3/04815; G06F 3/167; G06F 1/163; G06F 3/016; G06F 3/16; G06F 40/30; G06F 16/5866; G06F 16/90332; G06F 2203/012; G06F 3/038; G06F 3/0481; G06F 40/20; G06F 40/289; H04M 1/576; H04M 2201/50; H04M 2203/359; H04N 2201/3245; H04N 13/279; H04N 2201/0096; H04N 13/161; H04N 13/133; G10L 15/22; G10L 15/1815; G10L 15/18; G10L 15/1822; G10L 17/22; G10L 2015/088
See application file for complete search history.

(56) References Cited

U.S. PATENT DOCUMENTS

| | | | | |
|---|---|---|---|---|
| 2015/0097866 | A1* | 4/2015 | Mochizuki | G09G 5/38 345/633 |
| 2016/0027216 | A1* | 1/2016 | da Veiga | G06F 3/0484 345/419 |
| 2016/0378861 | A1* | 12/2016 | Eledath | G06K 9/00718 707/766 |
| 2017/0286383 | A1* | 10/2017 | Koul | A61F 9/08 |

(Continued)

*Primary Examiner* — Michael Ortiz-Sanchez
(74) *Attorney, Agent, or Firm* — Pillsbury Winthrop Shaw Pittman LLP

(57) ABSTRACT

In certain embodiments, speech is converted to text for theme identification by natural language processing. Notification data is generated based on detected themes and the notification data may include rules for notification presentation on a client device. The notification data may include parameters for processing image data captured by an augmented reality device to detect one or more objects. The objects may be associated with the theme and detection thereof within captured image data, and in accordance with other rules, may cause the augmented reality device to present a notification with contextual relevance to a current environment of a user utilizing the augmented reality device.

20 Claims, 4 Drawing Sheets

(56) References Cited

U.S. PATENT DOCUMENTS

| | | | | |
|---|---|---|---|---|
| 2018/0004481 A1* | 1/2018 | Fallon | .................. | G06F 3/04815 |
| 2018/0067717 A1* | 3/2018 | Limaye | ................... | G06F 3/011 |
| 2018/0114127 A1* | 4/2018 | Cole | ..................... | G06F 40/279 |
| 2018/0336414 A1* | 11/2018 | Badr | ................... | G06K 9/00671 |
| 2018/0338109 A1* | 11/2018 | Badr | .................... | H04N 1/2187 |
| 2019/0018694 A1* | 1/2019 | Rhodes | .................. | G10L 15/26 |
| 2019/0156837 A1* | 5/2019 | Park | ..................... | G06N 3/0454 |
| 2019/0341058 A1* | 11/2019 | Zhang | ................... | G10L 17/02 |
| 2020/0110864 A1* | 4/2020 | Casado | .................. | G10L 15/22 |
| 2020/0111242 A1* | 4/2020 | Gupta | ..................... | G06T 11/60 |

* cited by examiner

US 10,916,241 B1

THEME DETECTION FOR OBJECT-RECOGNITION-BASED NOTIFICATIONS

FIELD OF THE INVENTION

The invention relates to computer modeling for user and context-specific notifications, for example, a natural language processing model detects themes associated with objects identifiable by object recognition models to infer context for presenting notifications.

BACKGROUND OF THE INVENTION

Advances in computing power and software development technologies (including technologies that facilitate reduction in package size of integrated circuits) have made integration of computing hardware capable of relatively high performance into smaller devices possible, as well as increased the computing power and capabilities of such devices. Users frequently rely on such devices to keep track of tasks over the course of their day to day lives as those devices provide evermore features. Battery technology by contrast, while improved, remains a limiting factor in smaller devices even as performance per watt of computing hardware has increased. Specifically, while smaller devices, like a wearable device for which weight is a significant constraint, may include processors capable of performing relatively complex computations quickly, they typically do not include a battery capable of running such computations due to such constraints. As a result, users typically rely on manual entry (e.g., by voice or keyboard input) of task information in note or calendar applications with specific prompts. Complex operations, like image recognition, voice recognition, and other more complex computations can simplify the tracking of tasks to provide value to users over the course of their daily activities but drain available battery power quickly. Thus, the applicability of wearable devices for various more complex functions has been muted due to battery life other constraints on computing hardware. These and other drawbacks exist to providing a richer experience to users.

SUMMARY OF THE INVENTION

Aspects of the invention relate to methods, apparatuses, and/or systems for generating notifications related to objects in view on an augmented reality device based on themes (e.g., themes detected via natural language processing or other techniques).

In some embodiments, a computing device, like an augmented reality device, passively collects audio data in a buffer configured to discard passively collected audio data after a threshold period of time. The device may classify one or more segments of audio data in the buffer as likely including speech and obtain, from the buffer, a given segment of audio data based on the classification of the given segment of audio data within the threshold period of time. The device may provide the given segment of audio data and one or more other segments of audio data that likely include speech to a natural language processing model. The natural language processing model may identify at least one theme within the provided segments of audio data and identify a mapping of the at least one theme to at least one object, wherein the at least one object is associated with parameters of an object processing model operable to provide an output indicative of whether the object appears within an image. In turn, the device may receive the parameters of the object processing model and the identified theme for determining when to generate a notification. For example, the device may determine a quality measure for image data captured by an image capture device of the augment reality device and process image data exceeding a threshold value of quality. The processing may include processing the image data by the object processing model configured with the received parameters to detect whether the object appears within the image data. When the object is detected within the image data, the device may generate a notification coincident in time to the capture of the image data which presents the identified theme to a user.

Aspects of the invention relate to methods, apparatuses, and/or systems for identifying themes by natural language processing.

In some embodiments, a computer system obtains a training set comprising training chunks of natural language text and training records identifying themes within corresponding training chunks of natural language text. Training records may additionally indicate respective mappings of theme parameters to objects. Some of the training chunks of natural language text may be linked training chunks of natural language text that correspond to a given conversation having a central theme identified by corresponding training records. The computer system may generate a natural language processing model configured to provide an output indicative of whether a theme appears in a set of chunks of natural language text and an object associated with the theme by training on the training set with one or more natural language processing algorithms. The computer system may receive a request including a plurality of segments of audio data that likely include speech and convert the plurality of segments of audio data into a corresponding plurality of chunks of natural language text or receive the corresponding plurality of chunks of natural language text. The plurality of chunks of natural language text may be processed with the natural language processing model to identify at least one theme and at least one object associated with the theme. Parameters of an object processing model operable to provide an output indicative of whether the at least one object appears within an image may be obtained for a determination to present the corresponding theme in association with an identification of the object.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
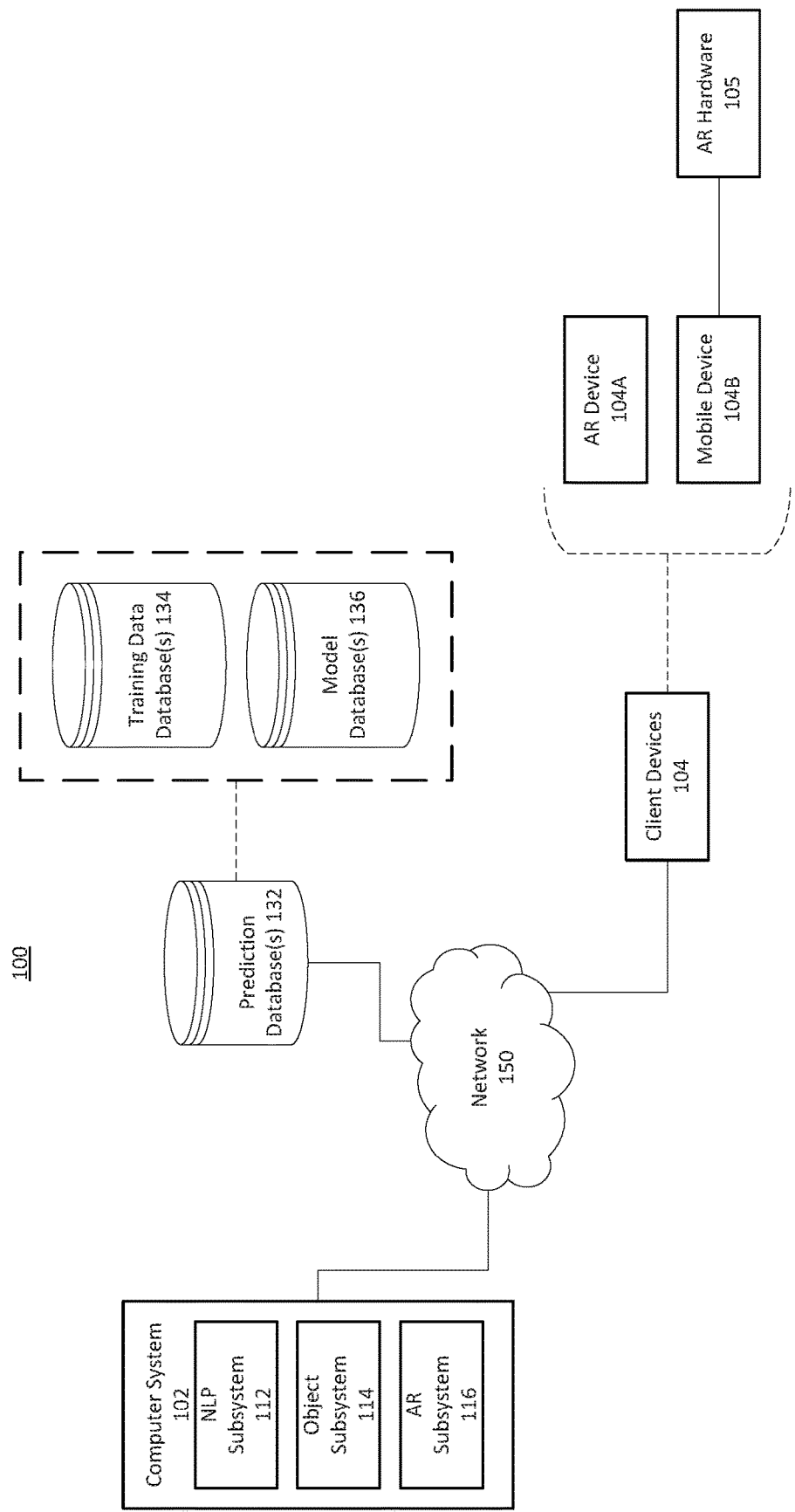
FIG. 1 shows a system for facilitating theme identification, in accordance with one or more embodiments.

FIG. 1 shows a system 100 for facilitating theme identification, in accordance with one or more embodiments. In some embodiments, the system 100 facilitates notification generation on client devices based on themes (e.g., detected by natural language processing). It should be noted that, although some embodiments are described herein with respect to analyzing audio to detect themes (e.g., via natural language processing), other techniques to detect themes (e.g., via image recognition) to facilitate notification generation may be used in one or more embodiments in lieu of or in addition to detection of themes via audio analysis. As shown in FIG. 1, the system 100 may include computer system 102, client devices 104 (such as example client devices 104A and 104B), or other components. For example, some example systems 100 may include a prediction database 132, like that illustrated, which may store data utilized by various other illustrated components, such as the computer system 102. The various components may communicate over a network 150 (which is not to suggest that a given component must communicate or be able to communicate with each other component), and the network 150 may include various private networks and public networks, such as the Internet.

Computer system 102 may include a natural language processing (NLP) subsystem 112, object subsystem 114, augmented reality (AR) subsystem 116, or other components. In some embodiments the computer system 102 is a server-system in a client-server based architecture, and the computer system 102 may scale to support tens to hundreds of thousands of client devices 104, or even millions of client devices. Thus, for example, the computer system 102 may include a variety of computing devices, which may be distributed geographically, and the various functions for the computer system 102 as described herein may be distributed among the different computing devices.

Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

The client devices 104 may include a desktop computer, a notebook computer, a tablet computer, a smartphone, a wearable device, or other client device. In some example embodiments, a client device 104 may be an augment reality (AR) device 104A configured to provide a set of native AR capabilities to a user. For example, in some embodiments, the AR device 104A may be a wearable device including native AR capabilities, like smart glasses (or smart eye glass), capable of performing computing operations like those ascribed to client devices 104 herein in a substantially stand-alone manner.

In some embodiments, a client device 104 may be a mobile device 104B which interfaces with AR hardware 105 to provide a set of AR capabilities otherwise not native to the mobile device to a user. Thus, for example, the AR hardware 105 may be a wearable device including AR compatible hardware, like in that of smart glasses (or that of a smart eye glass) accessory, but which offloads computing operations like those ascribed to client devices 104 herein to an associated processing device, like a processing device of the user, such as a mobile device 104B of the user. Examples of such a mobile device 104B may include a smartphone, tablet computer, or other processing device which the user retains on their person or in proximity while utilizing the AR hardware 105.

While various embodiments are discussed in reference to stand-alone augmented reality (AR) devices 104A, and especially those including native AR capabilities, it should be noted that AR capabilities may be added to other types of devices without such capabilities by wired or wireless interface with an AR capable hardware, like that illustrated by a mobile device 104B interfacing with AR hardware 105. Further, it should be noted that an AR device 104A including native AR capabilities and which may operate in a substantially stand-alone manner in some embodiments may also offload computing operations to an associated processing device of the user, or other processing device. In some embodiments, an AR device 104A may substantially offload computations via a network interface to a server system, such as via the network 150, rather than perform those computations or offload those computations to a mobile processing device. Additionally, an AR hardwire device 105, in some embodiments, may substantially offload computations via a network interface to a server system, such as via the network 150, rather than offload those computations to a mobile processing device. Accordingly, various configurations of AR capable client devices 104, whether by native capability or otherwise, are described herein.

As noted above, some embodiments include wearable AR devices 104A, examples of which can include smart glasses or smart eye glass. Thus, in some embodiments, the AR device 104A may be wearable computer glasses (or eye glass) comprising display and processing components configured to display information within a view of a user, such as while the user is wearing the AR device 104A. Alternatively, in some embodiments, a mobile device 104B may interface with AR hardware 105, which may be wearable AR hardware. Thus, in some embodiments, the wearable AR hardware 105 may be wearable glasses (or eye glass) comprising a display component configured to display information within a view of a user, such as information received from the mobile device 104B. In either instance, displayed information may include augmented reality information, like visual elements rendered within the view of the user in association with or amongst existing elements in reality or visual elements rendered based on existing elements in reality. In other words, augmented reality information may enrich user experience within the user's environment, such as based on existing elements within the viewing area of the user or otherwise (e.g., an AR experience may further include audible and other aspects). Augmented reality information may be contrasted with non-AR displayed information that does not enrich user experience, such as static display of an indication of remaining battery life of the device. In some embodiments, a displayed component is configured to superimpose displayed information onto a field of view of a user wearing the device. Examples display components may include an optical head mounted display, transparent heads up-display, or other augmented reality superposition or display. Example embodiments of such components may be configured to reflect, project, render, or otherwise display AR information.

In some embodiments, AR information enriches user experience within the user's environment. Accordingly, examples of AR hardware 105 and AR devices 104A may include or interface with components such as an image capture component by which information about the view and environment of the user may be obtained. For example, the image capture component may be calibrated to the display component such that positional information for display of AR content may be determined in relation to elements within a field of view of the image capture component (which may correspond to or overlap with a portion of the user's field of view). Thus, for example, if a cat is detected in a captured image, a label of "cat" may be displayed in relation to the cat within the user's field of view, an outline superimposed, and the like.

Examples of AR hardware 105 and AR devices 104A may include or interface with components such as microphones, to capture audio data, which may include spoken voice and other sounds, and speakers to playback audio data. Further, examples of AR hardware 105 and AR device 104A may include or interface with components such as one or more processors, some of which may be processors (e.g., of a mobile device 104B, computer system 102, or other server system) to which at least some data is offloaded, and other data may be resident to the AR hardware 105 or AR device 104A. To that end, examples of AR hardware 105 and AR devices 104A may include wireless or wired communicability, which may include, but is not limited to wired communications utilizing a USB or similar interface and wireless communications utilizing Bluetooth, WiFi, cellular (e.g., 4G, 5G, LTE, and the like) or other protocols. Additionally, examples of AR hardware 105 and AR devices 104A may include or interface with components such as global positioning sensors, motion sensors (e.g., 6-axis accelerometers), infrared sensors to augment image capture information for display of AR information, and the like.

In some embodiments, system 100 detects themes in speech by natural language processing, generates notification data based on detected themes, and transmits notification data to client devices by which clients process information captured by sensors to determine when to present a corresponding notification. For example, the system 100 may include a process by which a client device 104 (or devices) associated with a user capture audio data, which may include speech or other classifiable data, which is analyzed to identify themes which the client device 104 may present to the user as a notification. In some embodiments the client device 104 may process (e.g., speech to text, theme identification, and the like) the captured audio data or may transmit the captured audio data to another device, like a computer system 102 for one or more processing operations. In some embodiments, where the client device 104 processes the captured audio data, the client device 104 may process the captured audio data by one or more models provided by the computer system 102.

The system 100 may process captured audio, such as by converting speech within the captured audio to text and analyzing the text with natural language processing. Natural language processing may include a model (e.g., a natural language processing model) by which themes within a text (e.g., including one or more words, phrases, sentences, or paragraphs, some of which may include or be represented by a standard encoded character combination, or "emojis") are identified, such as by a predictive model that infers (e.g., based on scores associated with a text) a theme associated with the text. Theme information may also be inferred from the text, such as an action and urgency associated with the theme, and other contextual information as described herein. In some embodiments, system 100 may train or configure a prediction model, such as a machine learning model, to facilitate theme identification based on inputs, like one or more chunks of text. In some embodiments, system 100 may obtain information related to chunks of texts, like a sequencing of chunks and party to which the text (or respective texts) in a chunk or chunks correspond. In some cases, the party may be a known party, identified by voice recognition, or inference based on contextual information and information about a user device from which the chunk originated. Such information associated with text, and text inputs, may be encoded in a data structure and provided as input to a prediction model to generate predictions (e.g., related to whether a given theme can be identified from the inputs). For example, an input may include one or more chunks of text, a sequencing of the chucks of text (or words, phrases, etc. in a text), party (e.g., a given individual or indication of an individual different from other individuals) associated with respective chunks of text (or words, phrases, etc. in the text), and any related contextual information (location, timestamp, etc.). In turn, the system 100 may output a theme identified by the prediction model for notification of a user utilizing a client device 104. For example, theme notification information may be transmitted to a client device 104 (or other client device 104) of the user with which the collected audio data is associated. In other words, a request including audio data or text corresponding to audio data captured by a client device 104 may be processed and a theme notification including identified theme information provided as a result.

System 100 may provide an identified theme as feedback to the prediction model, which may be scored based on user feedback (e.g., user responses to themes) to the identified theme, such as whether a user acts on, dismisses, or otherwise interacts with a notification associated with the identified theme. Further, contextual information associated with the user response may also be provided as feedback and may include location, timestamp, etc. associated with an interaction. In turn, in an iterative training process, the prediction model may update one or more portions of the prediction model based on the prediction output and feedback score. In this way, for example, the prediction model may be trained or configured to generate more accurate predictions based on which identified themes are deemed more useful or accurate for users of client device 104 participating within the system 100. As such, in some embodiments, subsequent to the updating of the prediction model, system 100 may use the updated prediction model to not only identify themes but determine thresholds for notifications associated with a given identified theme. In some embodiments, the thresholds may be indicative of whether a notification for a theme should be generated (e.g., for processing by a client device) and whether theme information corresponding to a notification should be presented (e.g., based on a determination by the client device) according to respective thresholds or rules.

In some embodiments, a device of the system 100, like the computer system 102 may receive audio data for processing, such as by a natural language processing subsystem 112, which is configured to detect themes within the audio data, such as within speech included in the audio data. For example, the NLP subsystem 112 may process audio data to identify spoken words, phrases, and sentences, which may be associated with respective parties in a conversion involving multiple participants. An example speech to text processing of audio data, according to some embodiments, may detect inflection (e.g., tone, emphasis, speech pattern, etc.) in relation to the different words, phrases, and sentences in a conversion to identify the different parties and optionally enrich the text (e.g., to indicate tone or emphasis). In some embodiments, the different parties may be identified at a lower level, such as by speech recognition for known users, to associate specific labels like names or relationship to a user of a client with respective parties. In turn, the NLP subsystem 112 may process the text and any labels to identify themes within the speech (or conversation). An example theme may include (but is not limited to) an activity, such as "buy flowers," and context, such as "on the way home" based on the processing of speech including the phrase "it would be nice if you brought me flowers once in a while." Context may include various additional features, such as urgency, and the like, which may be detected within speech (e.g., a detected speaker, tone, time, place, and the like), or determined based on supplementary contextual information. Supplementary contextual information may be obtained by other sensors of the client device 104 and transmitted to the computer system 102 in association with the captured audio data including the speech or separately. In some embodiments, a client device 104 may encode captured supplementary contextual information for processing by the NLP Subsystem 112 (e.g., detected location: "home" may be provided in association with audio data rather than specific coordinates by which the NLP Subsystem 112 may infer a context for the activity) without disclosing sensitive user information (e.g., based on settings configured within a native application executed by a client participating within the system 100). In some embodiments, supplementary contextual information may be retained by the client device 104 and associated in memory with an identifier by which the client transmitted the captured audio data to the computer system 102, and a data structure of a response may include the identifier and fields by which a native application executing on the client may populate at least some contextual information (e.g., activity: "buy flowers," context: "on the way [location]" where location may be populated based on a stored location of home, work, etc.). Further, a client device 104 may determine contextual information and determine whether to capture or process data corresponding to a theme by one or more rules corresponding to the theme.

In some embodiments, the NLP subsystem 112 may include one or more neural networks or other machine learning models. For example, a natural language processing model may be implemented with a neural network trained to infer themes from chunks of natural language text. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, the parameters (e.g., weights, biases, neural network hyperparameters, etc.) of the neural network may be configured by way of training the neural network based on training data stored within a prediction database 132. The prediction database 132 may include one or more training data databases 134 containing training data, like a corpus of natural language texts. The training data database 134 may also include training records which describe texts or portions of texts within the database and may have a data structure corresponding to an input of chunks of natural language texts for input into the model or output of the model based on an input of identified chunks of natural language text. The records may also indicate contextual information, such as an urgency score, and may contain reference timestamps on which the urgency score is based such that the neural network may infer context from input texts. The records need not describe each text or every portion of a text. The training data and training records within the training data database 134 may be accessed by the computer system 102 to train a neural network for theme identification based on input chunks of text other than those in the training data set. The resulting neural network may be stored within the model database 136 (e.g., as a version of an NLP model) and subsequently accessed by the NLP subsystem 112. The NLP subsystem 112 may iteratively train the neural network to update an NLP model and periodically load a new version of the NLP model from the model database 136 to process natural language texts for theme identification. In some embodiments, models from the model databases 136 may be provided to one or more other devices or subsystems, for example, an NLP model may be provided a client device by which the client device my perform a theme identification with an NLP subsystem 112.

Figure 2:
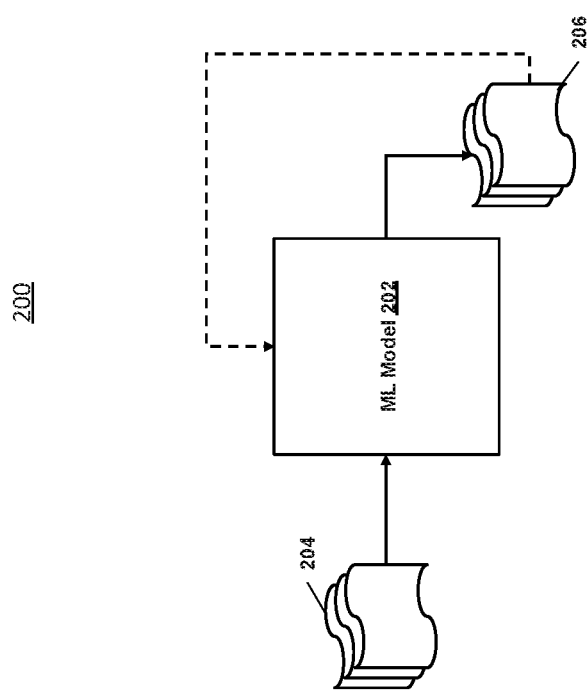
FIG. 2 shows a machine learning model configured to facilitate theme identification, in accordance with one or more embodiments.

As an example, with respect to FIG. 2, a processing environment 200 may include a machine learning model 202. An example machine learning model, such as a neural network or other machine learning model described herein, may take inputs 204 and provide outputs 206. For example, the model 202 may be fed an input or set of inputs 204 for processing based on a request and provide an output or set of outputs 206. In some cases, outputs 206 may be fed back to machine learning model 202 as input to train machine learning model 202 (e.g., alone or in conjunction with user indications of the accuracy of outputs 206, labels associated with the inputs, or with other feedback information). In another use case, machine learning model 202 may update its configurations (e.g., weights, biases, or other parameters) based on its assessment of its prediction (e.g., outputs 206) and feedback information (e.g., user indication of accuracy, reference labels, or other information). In another use case, where machine learning model 202 is a neural network, connection weights may be adjusted to reconcile differences between the neural network's prediction and the feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, a machine learning model 202 may include both one or more clustering models and one or more neural networks. For example, the model 202 may receive input data that includes natural language texts and other contextual information such as timestamps, geolocations, and the like. The model 202 may then use a clustering model generated from like contextual data in training data to modify or augment the input natural language text, such as to account for regional differences in meaning of words or phrases within the natural language text (e.g., "bloody" as associated with input text from a British national as opposed to a US national). The model 202 may then use a neural network to predict a theme based on the input text for the scenario based on regional dialect.

Different machine learning models 202 may be trained by different subsystem or for different purposes. In some embodiments, inputs or outputs of the various machine learning models utilized by the various subsystems may be structured in a way that enables the feeding of one model output into another model, like in stages. For example, the NLP subsystem 112 as described above may identify a theme from natural language texts. Other subsystems may process theme information determined by the NLP subsystem 112 to determine other information utilized within the system 100.

In some embodiments, an object subsystem 114 trains a machine learning model for mapping themes to objects. For example, the object subsystem may train a neural network or clustering model based on themes (e.g., identified by the NLP subsystem and/or records within training database 134) associated with object labels. For example, "buy a kitten" may be associated with labels like "cats" and "store." In some embodiments, a feedback mechanism may be utilized to refine theme output to correspond to known object labels, which may be implemented by clustering. For example, "buy" within the context may map to "stores/shops", some of which may be associated with kittens, like a pet store, or alternatively, a kitten shelter. Likewise, for object labeling, "kitten" may map more generally to "cats." Thus, for example, a broad set of possible themes may map to a narrower collection of object labels. Objects under an object label may be similarly clustered, such as to cluster objects, like various images of an object, under an object label, and each cluster may include a sub-label (e.g., pet stores). Relationships between clusters having different labels may be determined through training, some training for which may be based on natural language texts, such as by pairwise or (N minus distances) to determine frequencies of correspondence between object clusters and combinations of labels describing the clusters to which a theme maps. Thus, for example, "buy kitten" may map to objects labeled cat and also objects for stores sub-labeled pet store or animal shelter. In some embodiments, the clusters may be further refined be location, which may include third party data corresponding to store locations or other indications of where a given object may be found.

In some embodiments, the object subsystem 114 is configured to determine parameters of an object recognition model for identifying objects associated with themes. For example, for a given label, and a given cluster of objects, the object subsystem 114 may determine a set of parameters by which the object may be identified in an input image. The determined parameters of the object recognition model may be determined from training operations like that described above, such as on a training data set including some images of the object having a label associated with a theme. In other words, parameters of an object processing model operable to identify an object are determined for the different objects to which a theme may map. These relationships may be refined through iterative training to more accurately map themes to objects. In some embodiments, the parameters of an object recognition model for identifying an object associated with a theme may include parameters for a set of models available for object recognition operations.

In accordance with the above described features of the object subsystem 114, the object subsystem 114 may determine (optionally in coordination with the NLP subsystem 112) a mapping of themes to objects (e.g., by label). The mapping may be key-value pairs, or a deterministic mapping based on a processing of a theme. Additionally, the object subsystem 114 may determine parameters for object recognition models by which an object may be recognized in an image. Parameters by which an object may be recognized in an image by an object processing model may be stored within the model databases 136. In some cases, the model database 136 also includes the one or more models for which the object subsystem 114 determines parameters by which objects may be recognized. In some embodiments, the parameters may be sets of parameters for a respective set of models (e.g., an object processing model may include a number of models and the parameters indicate which constituent models to use and respective configurations or classification based on the output which are indicative of a presence of the object in an image). In some embodiments, the object subsystem 114 determines parameters for different object processing models, some of which may be device specific. Accordingly, the model database 136 may store different parameters for a set of models for a given device which may be different than those stored for another device.

In some embodiments, an AR Subsystem 116 determines notification information for transmission to client devices. The AR subsystem 116 may comprise information about client device 104 for structing notification information for different types of client devices. For example, different types of client devices may utilize different types of displays and hardware configurations. As a result, some devices may display some types of information better than others or can perform additional tasks over other devices. The AR subsystem 116 may store configurations of different client devices operable within the system 100. Additionally, the AR subsystem 116 may store a record of which client devices a user utilizes or is currently utilizing, thus for example a record of devices associated with a user may be accessed in association with transmitting notification information in response to a request from a client device. In some embodiments the notification information may be transmitted to a device other than the requesting device. The AR subsystem 116 may determine a device to transmit notification information to and configure the notification information based on the information about the particular client device, which may include an indication of sensor, display, and processing capabilities of the device. In turn, the AR subsystem 116 may configure a notification, such as with instructions for displaying theme information, one or more rules for presenting the notification, and parameters of an object processing model by the device can process collected image data to identify an object associated with the theme.

The above and other aspects of the system 100 illustrated system are described with reference to the following flowcharts of operations which may be performed within systems like that described above on one or more computing devices.

Example Flowcharts

Figure 3:
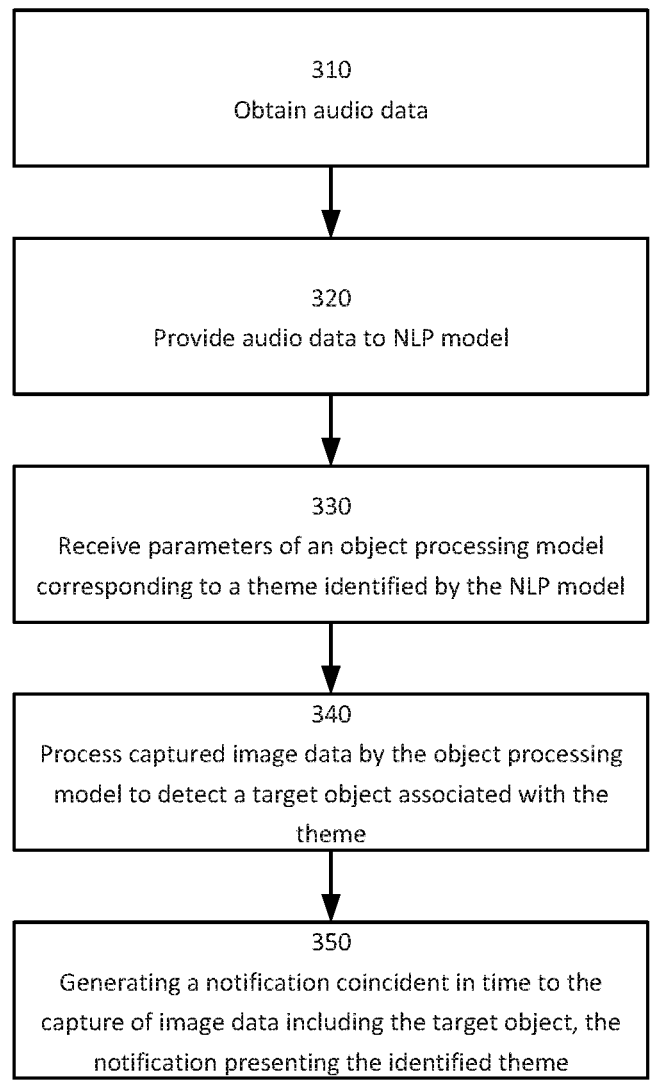
FIG. 3 shows a flowchart of a method of generating a notification on a client device, in accordance with one or more embodiments.
Figure 4:
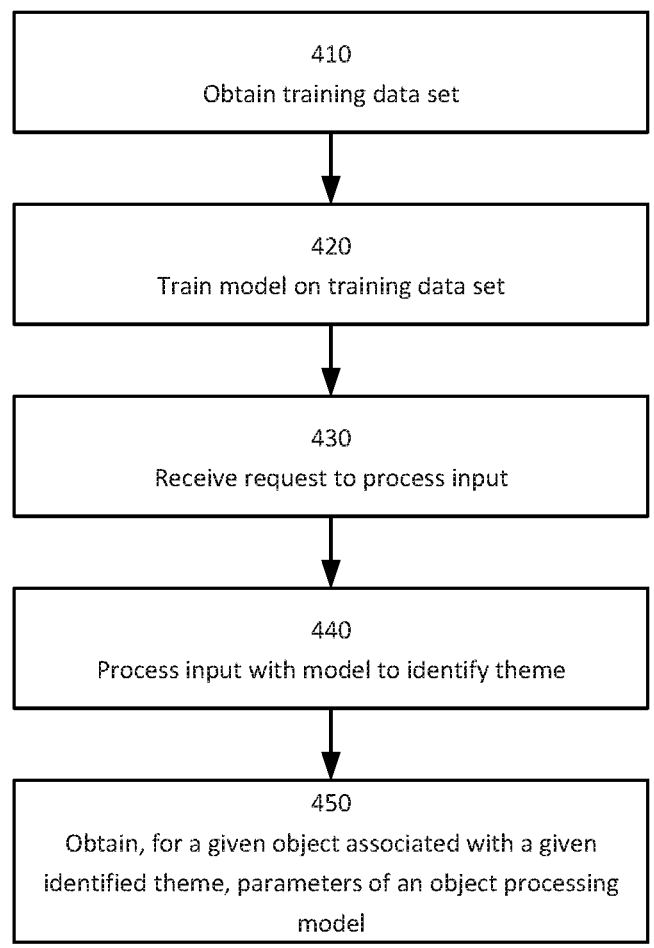
FIG. 4 shows a flowchart of a method of identifying themes by natural language processing, in accordance with one or more embodiments.

FIGS. 3-4 are example flowcharts of processing operations that enable the various features and functionality of the system as described in detail above. The processing operations presented below are intended to be illustrative and non-limiting. In some embodiments, for example, the processing operations may be accomplished with one or more additional operations not described, and/or without one or more of the operations discussed. Additionally, the order in which the processing operations are illustrated (and described below) is not intended to be limiting. In some embodiments, the processing operations may be stored as computer program instructions on a non-transitory computer-readable storage medium, which may be loaded into a memory and executed by a processor. In some embodiments, the processing operations correspond to a method by which the various steps may be implemented.

In some embodiments, the described processing operations may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations in response to instructions stored electronically on an electronic storage medium, such as a non-transitory computer-readable storage medium. The processing devices may include one or more devices configured through hardware, firmware, and/or software to be specifically designed for execution of one or more of the operations of the methods.

FIG. 3 shows a flowchart of a process 300 including operations for generating a notification on a client device, in accordance with one or more embodiments. In an operation 310, a client device may obtain audio data from its environment. For example, the client device may detect an audio signal via a sensor, such as a microphone or other sound sensor, and obtain the signal or signal information to capture audio data corresponding to the audio signal. For example, the sensor may sense and output an audio signal which is converted (e.g., by filtering and sampling one or more analog audio signals) into a digital audio data. Operation 310 may be performed by one or more client devices or hardware device associated with a user, which may coordinate capture of the audio data when two or more are in proximity to capture audio data from a same signal. In some embodiments, a given one of the two or more client devices discards captured audio data responsive to an indication from a second one of the two or more client devices indicating a higher quality of captured audio data (e.g., by signal to noise ratio, intensity, etc.).

In some embodiments, operation 310 comprises obtaining a segment of audio data. In some cases, the obtained segment is determined to (or has been determined to) likely contain speech. For example, in some embodiments, the operation comprises obtaining, by a client device AR device, or AR hardware device, an audio data stream collected by a sound sensor (e.g., having a microphone) of the device. For example, a device may passively collect audio data (e.g., as an ongoing operation with low power usage and minimal, if any, signal specific processing) in a buffer. The buffer may be configured to discard passively collected audio data after a threshold period of time. In some embodiments the sound sensor or other component of the device may include a signal processor or other processor configured to determine (e.g., with a classifier) a likelihood that a portion of the audio data stream includes human speech. In some embodiments, the determining with a classifier is performed in a pre-processing operation by the device. In some cases, a storing operation for the portion of the audio data stream is performed responsive to a determination by the device that the likelihood of that portion including human speech exceeds a threshold in a pre-processing operation. In some embodiments, the pre-processing operation is performed by a first classifier (e.g., like a passive filter while storing the audio data in a buffer) prior to a specific processing of the signal with a second classifier (e.g., based on an output or responsive to an output of the first filter), which may be staged to respectively output a likelihood. In some embodiments, a classifier or collection of classifiers are configured to classify segments of audio data in the buffer as likely including speech within the threshold period of time before they are discarded. Thus, for example, a segment may be obtained from the buffer (e.g., and stored in another memory or location) based on its classification before being discarded. In some embodiments, the device offloads stored segments of audio to a server system comprising a natural language processing model or to a mobile device of the user over a near field wireless communication protocol. In some embodiments, obtaining the segment of audio data comprises determining a likelihood that a given individual in a set of individuals is associated with speech in the segment of audio data and providing the segment of audio data to the natural language processing model comprises determining that the segment of audio data has a threshold likelihood that the given individual is associated with the speech.

In an operation 320, the client device provides obtained audio data to a natural language processing (NLP) model. For example, in some embodiments, the client device may transmit captured audio data (or otherwise obtained audio data, such as from a wearable device) to a computer system, like a server, that include an NLP subsystem by which the audio data is processed. In other embodiments, the client device may include an NLP subsystem to which the audio data is provided for processing. In either instance, a speech to text component of an NLP subsystem may convert speech within the audio data to text as described herein. The NLP subsystem may analyze the text corresponding to the audio data to identify a theme, which may include an activity and contextual information. In some embodiments, the identified theme may be encoded in a data structure including labels and rules, by which the theme is mapped to one or more objects. For example, in some embodiments, the computer system, like a server, includes an object subsystem by which parameters of object processing models for different objects having associated labels are determined. In other embodiments, the client device may include an object subsystem. In either instance, an object subsystem (or database populated by an object subsystem) may include a plurality of object processing models, each of which may include a set of parameters operable to identify a corresponding object (e.g., a cat, a flower, a character, or a string of characters, etc.) within an image. The above noted mapping may identify one or more object processing models, and the object subsystem or database may return parameters of an object processing model, like in response to query including the theme and based on theme-object mappings or an identifier of an object processing model obtained based on theme-object mappings. Thus, for example, a server system or device(s) by which one or more segments are processed with an NLP subsystem (or portion thereof) is configured to identify at least one theme within the provided segments of audio data and identify a mapping of the at least one theme to at least one object, and objects are associated with parameters of respective object processing models operable to provide an output indicative of whether the given object appears within an image.

In some embodiments, in the operation 320, the client device provides a segment of audio data and one or more other segments of audio data obtained within a threshold period of time corresponding to a conversation. Accordingly, in some embodiments, the client device may associate, with each segment, a respective timestamp, and optionally groups segments according to timestamps indicative of a same conversation (which is not to suggest the NLP subsystem may not perform the grouping). In some embodiments, a first collection of the segments is labeled as corresponding to a first individual that is a party to the conversation and a second collection of the segments is labeled as corresponding to a second individual that is a party to the conversation, such as by an NLP subsystem. In some embodiments, an NLP subsystem is configured to identify at least one theme within the provided segments of audio data in association with a given one of the individuals based on the labels, and the identified theme is specific to the given one of the individuals. In some embodiments, the first individual and the second individual are identified from a set of individuals based on scores output by a classifier, such as by processing the segments with the classifier to determine at least one score indicative of the first individual or the second individual for each of the segments and assigning a unique identifier (e.g., a label) associated with an individual to respective segments.

In turn, in an operation 330, the client device may receive the parameters of the object processing model and the identified theme. In some embodiments, the client device receives some or all of the above noted information in response to providing the obtained audio data to a computer system, like a server. In some embodiments, the client device receives some or all of the above noted information in response to processing the obtained audio data. In either instance, the client device may include an image processing subsystem by which images may be processed responsive to the parameters of the object processing model. In some embodiments, the image processing subsystem includes a plurality of models, and the received parameters of the object processing model include configuration parameters for a set of models by which images are to be processed to return an indication (e.g., like a binary result or weighted probability exceeding a threshold probability) of whether a given object appears in a given image. In some embodiments, the received parameters of the object processing model may include stage sequence parameters indicating one or more of an order and dependency or other rule governing one or more models in the set of models by which images are to be processed to identify the object. Specifically, it is noted that a client device may attempt to determine whether more than one object appears in a given image, and results of some models in the set for detecting some objects are applicable to other objects. For example, if a first object is a red car, a second object is a red barn, and a third object is a red rose, respective sets of models may each include a first filter with parameter(s) by which lighting or color may be corrected, normalized, or down-sampled (e.g., to reduce a size of color-space from X many colors to Y many colors where Y<X) in an image; each include a second filter with parameter(s) by which the color red may be localized within an image; and each include a feature detection algorithm with parameter(s) by which localized areas in the image are analyzed for objects features (e.g., edges, corners, etc.). However, for feature analysis, the respective sets of models may each include different feature analysis model parameter(s) to respectively determine a result as to whether a localized area includes a car, blanket, or rose. Accordingly, when a given image is obtained for analysis, a respective set of models may be identified for each object, sequencing of the models staged (e.g., in a hierarchy) according to the stage sequencing parameters, and applied to the given image based on the hierarchy and configuration parameters for the respective objects.

In an operation 340, the client device processes captured image data by the object processing model to detect a target object associated with the theme. For example, the client device may obtain an image captured by an image sensor of the client device or otherwise receive an image (e.g., from AR hardware). In either instance, the client device may process the image data, although in some cases, the client device may offload the image data to another device for analysis (which may be another device of the user or a server system). In some embodiments, the client device or AR hardware may determine a quality measure for image data captured by an image sensor device. In some cases, the quality measure may be based on the output of an image quality filter exceeding a threshold (or thresholds), such as a threshold of sharpness or thresholds for white balance (e.g., which may have a first threshold indicative of image data that is too dark and a second threshold indicate of image data that is too bright). In other words, given the power consumption of image processing and the power constrains of some devices, like mobile devices and AR devices, power consumption can be reduced by not processing captured image data below a threshold quality (e.g., as determined by lack of sharpness or too light or too dark). Other sensors on the device from which the image data is captured may also be polled, such as accelerometers, like a 6-axis accelerometer, and a rate acceleration in one or more axis may be determined with respect to the values of one or more registers or an indication of register values. In some embodiments, acceleration rates are monitored to determine a motion value, like a motion quality value, which may be indicative of a quality of image data an image sensor may capture and compared to threshold value of quality. For example, a motion quality value may be high while a user wearing an AR device to which the 6-axis accelerometer is mounted is determined to be standing still based on the polled acceleration rates. In contrast, a motion quality value may be lower when the user wearing the AR device (e.g., on their head) shakes their head or jumps around. Accordingly, in some embodiments, the client device may determine to process captured image data in response to a quality measure for the image data exceeding a threshold value of quality.

The image data may be processed with the object processing model based on the received parameters, and a result of the processing may indicate a value indicative of a likelihood that the object associated with the theme appears in the image. In some cases, the value may be compared to a threshold by which the client device determines whether to generate a corresponding notification. In some embodiments, the client device adjusts the threshold based on theme information. As noted above, an identified theme may include an activity and contextual information, which may be encoded in a data structure including labels and rules. In some embodiments, the client device reads the data structure to identify contextual information, which may specify an urgency (e.g., a specific given date and time or frequency) with which the user is to complete the activity. The client device may adjust the threshold responsive to the urgency and current contextual information obtained by the client device, such as to bias user convenience of completing the activity at time of notification. For example, "bring flowers home by tomorrow night" implies a specific urgency compared to "it would be nice if you brought flowers home sometime," and a threshold for notification based on a likelihood of detecting an object corresponding to the theme may be adjusted accordingly. For example, in the latter case, a threshold may be relatively high and adjusted in response to current contextual information indicative of the user being within a store within which the user can purchase roses, whereas in the former case a threshold may be relatively low and adjusted in response to current contextual information indicative of the user approaching a location corresponding to "home" and having not completed the activity.

As described above, an image may be processed for multiple different objects, and a theme can be associated with multiple objects by which a notification should be generated. Here, continuing with the example, in the latter case, a received object processing model may include parameters for detecting a rose in view of a user (e.g., non-urgent activity, higher convenience notification), while in the former case, a received object processing model (or multiple object processing models) may include parameters for detecting related objects, like a storefront or any type of flower, which may be less indicative of a specific opportunity for the user to complete the activity (e.g., urgent activity, lower convenience notification) but for which the user should be nonetheless notified in some cases (e.g., if the user is approaching home without having completed the activity, but not on the way to work). In other words, notification generation based on detection of an object may be biased according to urgency, the types of objects for detection by which a notification may be generated, and current contextual information. Here, the client device may process the data structure of the theme to determine when to process the image for an object (or a given one of the objects or multiple ones of the objects) associated with the theme, such as by one or rules responsive to urgency and current contextual information.

Examples of current contextual information may include current time, location, velocity, and the like, and rules may include various geofences within which an activity may be completed (e.g., geographic area including stores, geographic area of a store, and the like), absolute distance from a location with which the activity is associated (e.g., home, work, or the like), timing within which an activity may be completed (e.g., florist or supermarket is open from 9 am to 9 pm), and the like. In some embodiments, the client device may process (or capture for processing) image data by an object processing model based on one or more rules and sensor values. For example, an object processing model may be associated with a geofence and image data is processed by the parameters of that object processing model when the client device detects a location value from a positioning sensor being within the geofence.

In some embodiments, the client device may periodically poll a positioning sensor to determine a location of the user, determine whether the location of the user corresponds to an area associated with a geofence specified by a rule of an object processing model, and process (or capture for processing) image data by the object processing model configured with the received parameters while the location of the user corresponds to the area associated with the geofence specified by the rule. In some embodiments, the client device processes other captured image data by one or more object processing models configured with other received parameters while the location of the user corresponds to another area associated with another geofence specified by another rule received in association with another identified theme or another object associated with theme. By way of example, a first set of parameters may correspond to a first area associated with a geofence for detecting a first object and a second set of parameters may correspond to an expanded area associated with the geofence for detecting a second object. In some embodiments, an urgency may be associated with a theme, and the urgency may indicate a timing by which a user needs to complete an activity specified by the theme. In some embodiments, the client device may modify a geofence based on urgency. For example, a geofence specified by a rule may comprise a time-expansion value which may be modified based on an urgency.

In some embodiments, the time-expansion value specifies a rate to expand the geofence based on a system timestamp and a timestamp corresponding to when the activity should be completed or receipt of the identified theme. Here, the client device may determine a difference between a system timestamp and a timestamp specified by a rule, like a date and a time corresponding to an urgency of completing the activity of the identified theme. The client device may determine to process image data (or capture image data for processing) by an object processing model configured with the received parameters in response to a difference between the system timestamp and the timestamp specified by the rule exceeding a threshold. In instances where another theme has been received and includes a higher urgency, the client device may process, prior to the difference exceeding the threshold, captured image data by an object processing model configured with other received parameters when a difference between the system timestamp and a timestamp specified by another rule received in association with the another identified theme having exceeded another threshold. Thus, for example, the client device may determine when to capture or process image data for processing to identify a given object based on one or more rules specified by the theme the object is associated with, and rules like those outlined above among others may be encoded in a data structure.

In operation 350, the client device generates a notification coincident in time to the capture of image data including the target object associated with the theme. Further, embodiments of the generated notification are configured to present the identified theme. In some embodiments, the client device may present the identified theme with an AR display of the client device, or an AR display of an AR hardware device with which the client device interfaces. In either instance, the AR display presents AR display information within view of the user based on the notification. The information may be displayed coincident in time with user view of the object (which should be understood to include instances where the object is detected within or proximate to a viewing area of the user as inferred from where in captured image data the object is detected) associated with the theme. Specifically, the AR display information may be presented within a threshold period of time of image data capture, like less than 200 ms, and in some cases, much faster, like 66 ms or 33 ms or faster, such that information display corresponds with a user viewing (or still viewing) the object (e.g., where captured image data corresponds to a field of view of the user). Accordingly, in some embodiments, at least some of the AR display information within view of the user is displayed coincident with the user viewing the object. For example, the AR display information may outline, highlight, label, or otherwise identify the object as it appears within the user's view. Further, the AR display information may include theme information, such as text corresponding to the activity of the theme (e.g., buy flowers, buy flowers for [name], bring flowers to [location], and the like), or other visual information. Different types of information may be displayed in different ways, such as text corresponding to the activity and/or urgency within a specified area of the user's view (such as within a notification area), and an outline, highlight, or label of the detected object within a different area (such as that corresponding to the object). Thus, for example, notification generation may comprise determining an area, coordinates, and the like within which AR display information should be presented, which may include updating locations within which information is displayed based on next captured image data (e.g., as a result of the image sensor or object having moved within the display area or the user's view). As previously noted, different AR display devices of AR hardware or client devices may display AR display information in different ways, such as by rendering data on a screen, lens, or directly into a user's eye in accordance with different display (or projection) technologies. In each instance, the client device may process the image data, although in some cases, the client device may offload the image data to another device for analysis (which may be another device of the user or a server system).

Accordingly, as expressed above, some example embodiments contemplate a client device (or hardware) associated with the user performing operations 310 and 320 that is different from a client device that performs one or more of the other operations. In other words, the described operations need not be limited to a single client device, as users often utilize more than one device. Additionally, one or more devices may be compute-power-constrained, such as by an associated battery capacity and power consumption rate by computing components and/or by processor computing capabilities relative to other devices (e.g., an AR device or AR hardware or other wearable device may have limited processing power and/or battery life relative to a mobile phone, and a mobile phone may have more limited processing capabilities than a tablet or laptop computer and so on). Thus, while some client devices, like AR devices (e.g., like AR device 104A in FIG. 1), may perform each operation in some cases (which is not to suggest they must perform each operation or all aspects involved in an operation), they may also offload some operations in some instances (e.g., when paired with a mobile device of a user) or perform operations 330-350 based on audio data obtained and provided to the NLP model by other devices (e.g., another mobile device, like a mobile phone or smart watch, when the user is not utilizing the AR device 104A or even a smart home device) in addition to itself. Similarly, some client devices, like a system of a mobile device 104B interfaced with AR hardware 105, may perform each operation as a system (which is not to suggest they must perform each operation or all aspects involved in an operation) with the different components performing some operations but not others (e.g., the mobile device 104B may perform some aspects of the operations, such as obtaining, providing, and processing data, and the AR hardware 105 may perform some same operations like obtaining data and providing data and some different aspects like displaying a notification to the user). Similarly, client devices may offload some processing operations of aspects thereof to subsystems implemented by a computer system, like a server, as is also noted, without departing from the scope of the disclosure. Additional embodiments of operations within the scope of disclosure are described below, which should not be construed to suggest that all possible embodiments and variations are described.

FIG. 4 shows a flowchart of a process 400 including operations for identifying themes by natural language processing, in accordance with one or more embodiments. Depending on the embodiment, operations of the example process 400 may be performed by one or more computing devices. In some embodiments, the operations may be divided between multiple different computing devices. In some embodiments, a computing device or computing system, such as a server, performs the operations within a client-server architecture. In some embodiments, a computing device, like a client device, performs the operations within a client-server architecture, and a server provides one or more subsystems or models to the client device by which the client device may perform the operations. For example, the client device may execute a native application (e.g., obtained from the server or otherwise obtained on the device) to perform the operations. In some embodiments, one or more subsystems or models may be implemented in hardware or software on a computing device performing one or more of the operations of the process. Some embodiments of different ones of the operations may rely on data stored in one or more databases, which may be local databases, databases accessible via a network (public or private, and which may include the Internet), distributed databases with a cloud networking architecture, or combination thereof. In some embodiments, such as where a computer system is a server in a server-client architecture, various different servers, like edge servers of a network, may independently execute one or more operations of the example process for different client devices on the network based on client-server proximity, which may be a physical distance in terms of communication-link distance or network metrics like round trip times (e.g., ping in milliseconds) and throughput. In other words, edge servers may be geographically distributed within a network to service client devices accessing the network from within respective geographic regions.

In an operation 410, a computing device obtains a training data set. For example, the computing device may obtain the training data set from one or more databases like those described above. In some embodiments, the training data set comprises training chunks of natural language text and training records identifying themes within corresponding training chunks of natural language text. Training chucks of natural language text may be a word, phrase, sentence, or paragraph of text within the training data set. In some cases, a given text within the training data set may include multiple ones of such words, phrases, sentences or paragraphs. In some embodiments, a given text within the training data set may correspond to a conversation, which may include each or a subset of the parties to the conversation (e.g., some texts may include a subset of the sides of a conversation and other texts may include each side of a conversation). For example, in a conversation as it would typically occur between two individuals, one or both sides may be captured in a text, and each side may include a number of words, phrases, sentences, or paragraphs. In some embodiments, training chunks of natural language text are linked together, such as by key-value pairs or linked list or other data structure, and the linking of the training chunks encodes a sequencing of words, phrases, sentences, or paragraphs as identified from the respective training chucks. In some embodiments, the encoding may specify a first party corresponding to a first subset of the linked training chunks and a second party corresponding to a second subset of the linked training chunks, and so on, thereby encoding a sequence of the words, phrases, etc. in a conversation and the respective parties associated with the different words.

Embodiments of the training data set may also include training records. The training records may identify themes in at least some of the training chunks, and some training records may identify themes in at least some of the linked training chunks. For example, a training record may identify a theme in a training chunk (or chunks, such as linked training chunks). As noted above, a theme may include an activity and contextual information, which may be encoded in a data structure including labels and rules. A training record may identify at least one theme (e.g., central theme) corresponding to a training chunk or linked training chunks. In some embodiments, a training record may identify multiple themes, some of which may be party specific, such as for the different parties of linked training chunks. Some embodiments may break such a training record into multiple constituent records, such as for different combinations of parties, which may be associated with a parent training record. Thus, for example, a parent training record may identify a central theme for linked training chunks including each represented party, and a number of child records may identify subthemes for respective parties or combinations thereof. By way of example, a conversation between multiple parties discussing what they each want for Christmas may have a central theme (e.g., buy Christmas presents) and subthemes for the respective parties (e.g., first party wants a dog, second party wants a cat, third party does not want a cat, etc.). In some embodiments, a central theme and subtheme combination may be analyzed together as a single theme, such as by a combination of a central theme and subtheme with respect to a given party as identified by a training record. In some embodiments, such a combination (e.g., conveying "I want a dog") as communicated by one party may not involve action by each other party (or even any party). In the context of theme identification, themes may be analyzed from a perspective of the party requesting identification of a theme (which may occur substantially transparently) such that a notification generated based on the identified theme is relevant to the perspective of the user for which the notification is generated. By way of example, in the conversation between multiple parties discussing what they each want for Christmas, what one party (e.g., a child) wants may be relevant for a notification to one party (e.g., a parent) but not another (e.g., another sibling). Accordingly, the training records may identify themes present within the training chunks in association with various parties, and an action of a theme for one party may differ from another for a same collection of training chunks. Encoding these and similar relationships (such as by different themes having different actions for different parties within training chunks or linked trainings chunks) enables models trained on such information to infer a theme responsive to the perspective of a user of a client device (e.g., with more granularity to infer a specific action relevant to the user). In some embodiments, the training records encode themes in a data structure of a theme and optionally one or more subthemes, such as by fields identifying a party (e.g., first party), action (e.g., buy dog) and contextual information (e.g., present) that may also include timing/urgency (e.g., Christmas and associated date). Thus, for example, at least some training chunks and linked training chunks may have corresponding records within the training data set.

In some embodiments, a computing device obtains a training data set by scraping an information corpus for training data. An example information corpus may include structured data (e.g., a repository of specific data, like images or text) or unstructured data (e.g., images of the Internet) from which data, like images or text, may be parsed from other types of data to obtain structured data. As described above, a training data set may include records including labels for at least some structured data items (e.g., some objects in images, some themes in texts, etc.) for training. In some embodiments, the records may be formed in part by one or more preprocessing techniques or by other models, like a statistical model or clusters, by which related words and objects may be determined based on frequencies. For example, "buy, purchase, bring home, etc." may convey a similar meaning in some contexts, and may be relatively interchangeable. Likewise, roses may be often found in images of bouquets containing other types of flowers and the like, and which may convey a similar opportunity for an action (e.g., buy roses) based on recognition of other types of flowers or a bouquet.

In an operation 420, a computing device trains a model on the training data set. For example, the comping device may train on the training set with one or more natural language processing algorithms to generate a natural language processing (NLP) model configured to provide an output indicative of whether a theme appears in an input set of chunks of natural language text. The training may comprise one or more of the training techniques described previously herein on a training data set like that described above. Thus, for example, the NLP model may be a neural network or other model, or combination of models described herein for inferring a theme from a natural language input. In some embodiments, the NLP model is configured to infer a theme with respect to a given party from a given perspective (e.g., associated with the input). In other words, the NLP model may identify that party B wants party A to buy flowers for party B from the perspective of a party A for a text input of "it would be nice if you brought me flowers" provided by party A.

In some embodiments, a training record is associated with one or more objects. For example, a theme of a training record may be mapped to one or more objects. The mapping may specify direct and indirect associations. For example, a record for the theme "buy flowers" may be mapped to flowers and storefronts, and "buy roses" may be mapped to roses and storefronts, but also may be mapped to other types of flowers as a store having tulips for sale would likely sell roses. In other words, the object mapping need not correlate only to a word in the theme (e.g., car=car object) but also object indicative of the action (e.g., buy car=objects indicative of car dealerships and a car object, which may be a specific car object found at a particular dealership for which the objects are indicative, such as for a logo of a brand of a given car or logos of the various dealerships associated with the brand). In some embodiments, mappings may be inferred from natural language text, such as from text of one or more tags associated with an object in an image, where at least some tags correspond to at least some words or phrases of themes within a record.

In some embodiments, the computing device is further configured to obtain an object training set comprising training images containing objects and object training records identifying labels of objects within the corresponding training images. The object training records may identify at least some labels of objects associated with themes within the training records for themes. Thus, for example, at least some theme records and the themes therein may be mapped to labels based on their respective parameters. In turn, in some embodiments, embodiments of a model training process may comprise a computing device training on the object training set with one or more image recognition algorithms to determine, for an object within an image, parameters of an object processing model operable to provide the output indicative of whether the object appears within the image. Thus, for example, other images may be analyzed by an object processing model configured with the determined parameters for the object whether the object appears within one or more of the other images. In some embodiments, the training of the object processing model comprises segmenting the object training set based on the mappings of theme parameters to labels of respective ones of the objects associated with the themes. Accordingly, training of the object processing model may comprise training on different segments of the object training set to determine different sets of parameters of the object processing model for respective objects associated with a given theme. Thus, for example, for a given theme, which may map to at least one given object, a set of parameters for configurating an object processing model to identify the given object may be selected from the different sets of parameters of the object processing model (e.g., for identifying various different objects) based on theme to object mappings.

In an operation 430, a computing device may receive a request to process an input. In some embodiments, the input is captured audio data, which may likely contain speech. For example, a device may detect an audio signal via a sensor, such as a microphone or other sound sensor, other otherwise obtain the signal or signal information corresponding to captured audio data. Based upon a determination the captured audio data contains (or likely contains) speech, a computing device may convert the captured audio data to text, such as by converting speech within the captured audio data to natural language text. In some embodiments, the input is natural language text. In either instance, the natural language text may be segmented into chunks, such as based on natural pauses in captured audio data, party identification (e.g., based on voice recognition distinguishing between different parties), according to an encoding of the natural language text, and the like. In some embodiments, the chunks may be linked, such as to represent the conversation between the constituent parties. In turn, an NLP model, like that described above, may be utilized by a computing device to process input natural language text or linked chunks of natural language text. For example, the NLP model may analyze the text corresponding to the audio data and provide output scores corresponding to one or more themes. A theme having the highest score, and which may exceed a threshold score, may be identified as a theme inferred from the input.

The identified theme may include an indication of a central theme, which may include an activity and contextual information. In some embodiments, identified themes for which an activity is also identified are selected for notifications. In some embodiments, the identified theme may be encoded in a data structure including labels and rules, by which the theme is mapped to one or more objects, such as by the above described theme to object mappings.

Thus, for example, in operation 440 a computing device may process natural language text with an NLP model to identify at least one theme. For example, the theme may be a theme identified in the plurality of chunks of natural language text from the perspective of a user of a client device having captured the audio data with which the chunks of natural language are associated. In some embodiments, one or more associated parameters of the theme are identified by the NLP model based on the input text. For example, "sometime" may convey non-urgency, "Christmas" may convey a specific timing and date (which may be urgent or not urgent depending a current date), or "by tomorrow" may convey high urgency irrespective of a current date. Thus, for example, the associated parameter may convey a timing or urgency associated with the theme. In some embodiments, the computing device may determine one or more rules for triggering a notification for the identified theme based on a parameter conveying a timing or urgency or geographic area(s) (e.g., geofences) associated with the theme. For example, the theme may include an action, which may be conveyed by a notification, and the urgency may indicate when or how often the notification should be presented and geofences may indicate within which areas a notification should be presented (e.g., in general, transition to/from a fenced area, etc.). Urgency may also relate to other rules, such as geofences for triggering a notification as well as selection of objects which may be more closely related to opportunity to complete an action as opposed to a more general reminder. For example, an object selected for a theme having a low urgency may be different than an object selected for a same theme having a high urgency—and different objects may be associated with different opportunity costs for completing an action. In some embodiments, these relationships are encoded by scores or distances determined between a theme and one or more objects. For example, the higher the urgency, the more general the object may be to the action (as it encompasses more opportunities but with higher opportunity cost, like less convenience) while the lower the urgency, the more specific the object may be to the action (as it encompasses less opportunity but lower opportunity cost, like high convenience). Thus, for example, multiple rules may be determined, such as a rule that specifies a geofence corresponding to a location within which to trigger a notification and a rule that specifies a time range within which to trigger a notification, and these rules may be analyzed to determine when to perform other operations for generating a notification (e.g., when to process image data for determining whether an object, associated with a theme to which the notification corresponds, appears within an image, which may be performed in substantially real-time based on image data obtained by an augmented reality device.)

Accordingly, in some embodiments, the identified theme may be mapped to at least one object associated with the theme. The mapping may take into account one or more of the parameters like those described above by one or more scores or distances associated with a relationship specified by the mapping. Accordingly, for an identified theme, one or more objects may be identified based on the mapping. For the example theme of "buy flowers," the mapping may associate flowers with an object like a rose or a tulip, and "buy" with stores, which may be subcategorized, and an object selected based on the mapping, like a logo of a store subcategorized as a supermarket or florist. Object selection may be responsive in part to an urgency (e.g., in minutes, days, hours, proximity to a location associated with the action) as described above. One or more objects may be identified, and one or more of the identified objects may be selected based on the mapping. In some embodiments the mapping is based on one or more clusters of objects associated with different themes, but may also be a data structure of key-value pairings.

In an operation 450 a computing device may obtain, for a given object associated with a given identified theme, parameters of an object processing model. For example, a server may obtain the parameters for an object processing model, and transmit the identified theme, rules, and the parameters to a client device. In some embodiments, generation of notification information to a client device includes accessing a record of themes identified in association with one or more prior requests received from the client device. In some embodiments, an urgency or whether the theme should be transmitted may be updated based on the record, which may include feedback from the client device or other client devices associated with the user indicating whether the user completed the action associated with the theme. In turn, the server may determine whether to transmit notification information including the parameters of the object processing model and the identified theme based on a frequency with which the identified theme appears in the record compared to another identified theme.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database (s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices. Client devices as described herein may similarly include electronic storages, one or more physical processors programmed with one or more computer program instructions, and/or other components; and in some cases, multiple client devices or a client and interfaced hardware device may exchange information as described above amongst each other or computer systems or subsystems as described herein.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.).

The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems of other devices described herein, such as those of client devices 104. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 or client devices 104 and hardware configurations or systems described herein is for illustrative purposes, and is not intended to be limiting, as any of subsystems 112-116 or client device 104 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116. Similarly, different client device 104 may include different functionality and different hardware and some client devices may interface with additional or different external hardware to provide additional or similar functionality to that of or over other client devices.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. An embodiment of a compute-power-constrained augmented reality device for generating notifications related to objects in view on the augmented reality device based on themes detected by natural language processing of speech, comprising: one or more processors programmed with computer program instructions that, when executed, cause the augmented reality device to: passively collect audio data in a buffer, the buffer configured to discard passively collected audio data after a threshold period of time; classify segments of audio data in the buffer as likely including speech, each of the segments classified within the threshold period of time; obtain, from the buffer, a given segment of audio data based on a classification of the given segment of audio data within the threshold period of time, the audio data corresponding to the given segment being discarded from the buffer; provide the given segment of audio data and one or more other segments of audio data that likely include speech to a natural language processing model, wherein the natural language processing model is configured to: identify at least one theme within the provided segments of audio data, and identify a mapping of the at least one theme to at least one object, wherein the at least one object is associated with parameters of an object processing model operable to provide an output indicative of whether the object appears within an image; receive the parameters of the object processing model and the identified theme; determine a quality measure for image data captured by an image capture device of the augment reality device; process on the augmented reality device, in response to the quality measure for the image data exceeding a threshold value of quality, the image data by the object processing model configured with the received parameters to detect whether the object appears within the image data; and in response to detecting the object appearing within the image data, generate a notification coincident in time to the capture of the image data, the notification presenting the identified theme to a user.

2. The augmented reality device in accordance with any of the above embodiments, wherein receiving the parameters of the object processing model and the identified theme further comprises receiving one or more rules for processing image data by the object processing model with the parameters.

3. The augmented reality device in accordance with any of the above embodiments, wherein the computer program instructions further cause the augmented reality device to: periodically poll a positioning sensor of the augmented reality device to determine a location of the user; determine whether the location of the user corresponds to an area associated with a geofence specified by a rule; and process the image data by the object processing model configured with the received parameters while the location of the user corresponds to the area associated with the geofence specified by the rule.

4. The augmented reality device in accordance with any of the above embodiments, wherein the computer program instructions further cause the augmented reality device to process other image data by the object processing model configured with other received parameters while the location of the user corresponds to another area associated with another geofence specified by another rule received in association with another identified theme.

5. The augmented reality device in accordance with any of the above embodiments, wherein the geofence specified by the rule comprises a time-expansion value, the time-expansion value specifying a rate to expand the geofence based on a system timestamp and a timestamp corresponding to receipt of the identified theme.

6. The augmented reality device in accordance with any of the above embodiments, wherein the received parameters include a first set of parameters corresponding to a first area associated with the geofence for detecting a first object and a second set of parameters corresponding to an expanded area associated with the geofence for detecting a second object.

7. The augmented reality device in accordance with any of the above embodiments, wherein the computer program instructions further cause the augmented reality device to: determine a difference between a system timestamp and a timestamp specified by a rule, wherein the timestamp specified by the rule is a date and a time corresponding to the identified theme; and process the image data by the object processing model configured with the received parameters in response to the difference between the system timestamp and the timestamp specified by the rule exceeding a threshold, wherein, prior to the difference exceeding the threshold, the augmented reality device processes other image data by the object processing model configured with other received parameters when a difference between the system timestamp and a timestamp specified by another rule received in association with another identified theme having exceeded another threshold.

8. An embodiment of a method comprising: obtaining, by an augmented reality device, a segment of audio data providing the segment of audio data to a natural language processing model, wherein the natural language processing model: identifies at least one theme within the provided segment of audio data, and identifies a mapping of the at least one theme to at least one object, wherein the at least one object is associated with parameters of an object processing model operable to provide an output indicative of whether the object appears within an image; receiving the parameters of the object processing model and the identified theme; processing on the augmented reality device, in response to capturing image data, the image data by the object processing model configured with the received parameters to detect whether the object appears within the image data; and in response to detecting the object appearing within the image data, generating a notification coincident in time to the capture of the image data, the notification presenting the identified theme to a user.

9. The method in accordance with any of the above embodiments, wherein: obtaining the segment of audio data comprises determining a likelihood that a given individual in a set of individuals is associated with speech in the segment of audio data; and providing the segment of audio data to the natural language processing model comprises determining that the segment of audio data has a threshold likelihood that the given individual is associated with the speech.

10. The method in accordance with any of the above embodiments, wherein: the segment of audio data and one or more other segments of audio data are obtained within a threshold period of time corresponding to a conversation; and a first collection of the segments is labeled as corresponding to a first individual that is a party to the conversation and a second collection of the segments is labeled as corresponding to a second individual that is a party to the conversation.

11. The method in accordance with any of the above embodiments, wherein: the natural language processing model is further configured to identify at least one theme within the provided segments of audio data in association with a given one of the individuals based on the labels; and the notification presenting the identified theme to the user identifies the given one of the individuals associated with the theme.

12. The method in accordance with any of the above embodiments, wherein: the first individual and the second individual are identified from a set of individuals based on scores output by a classifier, the augmented reality device processing the segments with the classifier to determine at least one score indicative of the first individual or the second individual for each of the segments; and labeling comprises assigning a unique identifier associated with an individual.

13. The method in accordance with any of the above embodiments, wherein obtaining a segment of audio data likely containing speech comprises: obtaining an audio data stream collected by a microphone of the augmented reality device; determining, with a classifier, a likelihood that a portion of the audio data stream includes human speech; and storing the portion of the audio data stream if the likelihood of that portion including human speech exceeds a threshold.

14. The method in accordance with any of the above embodiments, wherein the augmented reality device is compute power constrained, the method further comprising: providing the segment of audio data to the natural language processing model by offloading the segment of audio data to: a server system comprising the natural language processing model; or a mobile device of the user over a near field wireless communication protocol.

15. An embodiment of a system for identifying themes by natural language processing, the system comprising: a computer system that comprises one or more processors programmed with computer program instructions that, when executed, cause the computer system to: obtain a training set comprising training chunks of natural language text and training records identifying themes within corresponding training chunks of natural language text, wherein: at least some of the training chunks of natural language text are linked training chunks of natural language text, a given set of linked training chunks of natural language text corresponding to a given conversation having a central theme identified by corresponding training records, and each training record identifying a theme comprises a mapping of theme parameters to objects; train on the training set with one or more natural language processing algorithms to generate a natural language processing model configured to provide an output indicative of whether a theme appears in a set of chunks of natural language text and an object associated with the theme; receive, from an augmented reality device, a request including a plurality of segments of audio data that likely include speech; convert the plurality of segments of audio data into a corresponding plurality of chunks of natural language text; process, with the natural language processing model, the plurality of chunks of natural language text to identify at least one theme and at least one object associated with the theme; obtain, for a given object associated with a given identified theme, parameters of an object processing model operable to provide an output indicative of whether the object appears within an image; and transmit to the augmented reality device, responsive to the request, the parameters of the object processing model and the identified theme.

16. The system in accordance with any of the above embodiments, wherein the computer system is further configured to: obtain an object training set comprising training images containing objects and object training records identifying labels of objects within the corresponding training images, wherein: at least some of the training images contain objects associated with the themes, and the mapping of theme parameters to objects comprises a mapping of theme parameters to labels of respective ones of the objects associated with the themes; and train on the object training set with one or more image recognition algorithms to determine, for the object, the parameters of the object processing model operable to provide the output indicative of whether the object appears within an image.

17. The system in accordance with any of the above embodiments, wherein the computer system is further configured to: segment the object training set based on the mapping of theme parameters to labels of respective ones of the objects associated with the themes, wherein: training on the object training set comprises training on segments of the object training set to determine different sets of parameters of the object processing model for respective objects associated with a given theme; and obtaining, for the given object associated with the given identified theme, the parameters of the object processing model comprises selecting a set of parameters from the different sets of parameters of the object processing model based the identified theme.

18. The system in accordance with any of the above embodiments, wherein identifying the at least one theme comprises identifying a theme and at least one associated parameter, the at least one associated parameter conveying a timing or urgency associated with the theme, the computer system further configured to: determine one or more rules for triggering a notification for the identified theme based on the at least one parameter conveying a timing or urgency associated with the theme.

19. The system in accordance with any of the above embodiments, wherein: a first rule specifies a geofence corresponding to a location within which to trigger the notification when the object appears within an image obtained by the augmented reality device; and a second rule specifies a time range within which to trigger the notification when the object appears within an image obtained by the augmented reality device.

20. The system in accordance with any of the above embodiments, wherein the computer system is further configured to: access a record of themes identified in association with one or more prior requests received from the augmented reality device; and determining to transmit the parameters of the object processing model and the identified theme based on a frequency with which the identified theme appears in the record compared to another identified theme.

21. A method of operating a device or system in accordance with any of the above embodiments.

22. A tangible, non-transitory, machine-readable medium storing instructions that, when executed by a data processing apparatus, cause the data processing apparatus to perform operations comprising those of any of the above embodiments of a device, method, or system.

23. A system comprising: one or more processors; and memory storing instructions that, when executed by the processors, cause the processors to effectuate operations comprising those of any of the above embodiments of a method.

What is claimed is:
1. A compute-power-constrained augmented reality device for generating notifications related to objects in view on the augmented reality device based on themes detected by natural language processing of speech, comprising:
one or more processors programmed with computer program instructions that, when executed, cause the augmented reality device to:
passively collect audio data in a buffer, the buffer configured to discard passively collected audio data after a threshold period of time;

classify segments of audio data in the buffer as likely including speech, each of the segments classified within the threshold period of time;

obtain, from the buffer, a given segment of audio data based on a classification of the given segment of audio data within the threshold period of time, the audio data corresponding to the given segment being discarded from the buffer;

provide the given segment of audio data and one or more other segments of audio data that likely include speech to a natural language processing model, wherein the natural language processing model is configured to:
identify at least one theme within the provided segments of audio data, and
identify a mapping of the at least one theme to at least one object, wherein the at least one object is associated with parameters of an object processing model operable to provide an output indicative of whether the object appears within an image;

receive the parameters of the object processing model and the identified theme;

capture, by an image capture device of the augmented reality device, image data after receiving the parameters of the object processing model and the identified theme;

determine a quality measure for the image data captured by the image capture device of the augment reality device;

process on the augmented reality device, in response to the quality measure for the image data exceeding a threshold value of quality, the image data by the object processing model configured with the received parameters to detect whether the object appears within the image data; and in response to detecting the object appearing within the image data, generate a notification coincident in time to the capture of the image data, the notification presenting the identified theme to a user.

2. The augmented reality device of claim 1, wherein receiving the parameters of the object processing model and the identified theme further comprises receiving one or more rules for processing image data by the object processing model with the parameters.

3. The augmented reality device of claim 2, wherein the computer program instructions further cause the augmented reality device to:
periodically poll a positioning sensor of the augmented reality device to determine a location of the user;
determine whether the location of the user corresponds to an area associated with a geofence specified by a rule; and
process the image data by the object processing model configured with the received parameters while the location of the user corresponds to the area associated with the geofence specified by the rule.

4. The augmented reality device of claim 3, wherein the computer program instructions further cause the augmented reality device to process other image data by the object processing model configured with other received parameters while the location of the user corresponds to another area associated with another geofence specified by another rule received in association with another identified theme.

5. The augmented reality device of claim 3, wherein the geofence specified by the rule comprises a time-expansion value, the time-expansion value specifying a rate to expand the geofence based on a system timestamp and a timestamp corresponding to receipt of the identified theme.

6. The augmented reality device of claim 5, wherein the received parameters include a first set of parameters corresponding to a first area associated with the geofence for detecting a first object and a second set of parameters corresponding to an expanded area associated with the geofence for detecting a second object.

7. The augmented reality device of claim 2, wherein the computer program instructions further cause the augmented reality device to:
determine a difference between a system timestamp and a timestamp specified by a rule, wherein the timestamp specified by the rule is a date and a time corresponding to the identified theme; and
process the image data by the object processing model configured with the received parameters in response to the difference between the system timestamp and the timestamp specified by the rule exceeding a threshold, wherein, prior to the difference exceeding the threshold, the augmented reality device processes other image data by the object processing model configured with other received parameters when a difference between the system timestamp and a timestamp specified by another rule received in association with another identified theme having exceeded another threshold.

8. A method comprising:
obtaining, by an augmented reality device, a segment of audio data;
providing the segment of audio data to a natural language processing model, wherein the natural language processing model:
identifies at least one theme within the provided segment of audio data, and
identifies a mapping of the at least one theme to at least one object, wherein the at least one object is associated with parameters of an object processing model operable to provide an output indicative of whether the object appears within an image;
receiving the parameters of the object processing model and the identified theme;
capturing, by the augmented reality device, image data after receiving the parameters of the object processing model and the identified theme;
processing on the augmented reality device, in response to capturing the image data, the image data by the object processing model configured with the received parameters to detect whether the object appears within the image data; and
in response to detecting the object appearing within the image data, generating a notification coincident in time to the capture of the image data, the notification presenting the identified theme to a user.

9. The method of claim 8, wherein:
obtaining the segment of audio data comprises determining a likelihood that a given individual in a set of individuals is associated with speech in the segment of audio data; and
providing the segment of audio data to the natural language processing model comprises determining that the segment of audio data has a threshold likelihood that the given individual is associated with the speech.

10. The method of claim 8, wherein:
the segment of audio data and one or more other segments of audio data are obtained within a threshold period of time corresponding to a conversation; and a first collection of the segments is labeled as corresponding to a first individual that is a party to the conversation and a second collection of the segments is labeled as corresponding to a second individual that is a party to the conversation.

11. The method of claim 10, wherein:
the natural language processing model is further configured to identify at least one theme within the provided segments of audio data in association with a given one of the individuals based on the labels; and
the notification presenting the identified theme to the user identifies the given one of the individuals associated with the theme.

12. The method of claim 10, wherein:
the first individual and the second individual are identified from a set of individuals based on scores output by a classifier, the augmented reality device processing the segments with the classifier to determine at least one score indicative of the first individual or the second individual for each of the segments; and
labeling comprises assigning a unique identifier associated with an individual.

13. The method of claim 8, wherein obtaining a segment of audio data likely containing speech comprises:
obtaining an audio data stream collected by a microphone of the augmented reality device;
determining, with a classifier, a likelihood that a portion of the audio data stream includes human speech; and
storing the portion of the audio data stream if the likelihood of that portion including human speech exceeds a threshold.

14. The method of claim 8, wherein the augmented reality device is compute power constrained, the method further comprising:
providing the segment of audio data to the natural language processing model by offloading the segment of audio data to:
a server system comprising the natural language processing model; or
a mobile device of the user over a near field wireless communication protocol.

15. A system for identifying themes by natural language processing, the system comprising:
a computer system that comprises one or more processors programmed with computer program instructions that, when executed, cause the computer system to:
obtain a training set comprising training chunks of natural language text and training records identifying themes within corresponding training chunks of natural language text, wherein:
at least some of the training chunks of natural language text are linked training chunks of natural language text, a given set of linked training chunks of natural language text corresponding to a given conversation having a central theme identified by corresponding training records, and
each training record identifying a theme comprises a mapping of theme parameters to objects;
train on the training set with one or more natural language processing algorithms to generate a natural language processing model configured to provide an output indicative of whether a theme appears in a set of chunks of natural language text and an object associated with the theme;
receive, from an augmented reality device, a request including a plurality of segments of audio data that likely include speech;
convert the plurality of segments of audio data into a corresponding plurality of chunks of natural language text;
process, with the natural language processing model, the plurality of chunks of natural language text to identify at least one theme and at least one object associated with the theme;
obtain, for a given object associated with a given identified theme, parameters of an object processing model operable to provide an output indicative of whether the object appears within an image; and
transmit to the augmented reality device, responsive to the request:
the identified theme; and
the parameters of the object processing model, by which the augmented reality device processes image data to detect whether the object appears within the image data for presenting the identified theme.

16. The system of claim 15, wherein the computer system is further configured to:
obtain an object training set comprising training images containing objects and object training records identifying labels of objects within the corresponding training images, wherein:
at least some of the training images contain objects associated with the themes, and
the mapping of theme parameters to objects comprises a mapping of theme parameters to labels of respective ones of the objects associated with the themes; and
train on the object training set with one or more image recognition algorithms to determine, for the object, the parameters of the object processing model operable to provide the output indicative of whether the object appears within an image.

17. The system of claim 16, wherein the computer system is further configured to:
segment the object training set based on the mapping of theme parameters to labels of respective ones of the objects associated with the themes, wherein:
training on the object training set comprises training on segments of the object training set to determine different sets of parameters of the object processing model for respective objects associated with a given theme; and
obtaining, for the given object associated with the given identified theme, the parameters of the object processing model comprises selecting a set of parameters from the different sets of parameters of the object processing model based on the identified theme.

18. The system of claim 15, wherein identifying the at least one theme comprises identifying a theme and at least one associated parameter, the at least one associated parameter conveying a timing or urgency associated with the theme, the computer system further configured to:
determine one or more rules for triggering a notification for the identified theme based on the at least one parameter conveying a timing or urgency associated with the theme.

19. The system of claim 18, wherein:
a first rule specifies a geofence corresponding to a location within which to trigger the notification when the object appears within an image obtained by the augmented reality device; and a second rule specifies a time range within which to trigger the notification when the object appears within an image obtained by the augmented reality device.

20. The system of claim 15, wherein the computer system is further configured to:
- access a record of themes identified in association with one or more prior requests received from the augmented reality device; and
- determining to transmit the parameters of the object processing model and the identified theme based on a frequency with which the identified theme appears in the record compared to another identified theme.

* * * * *